United States Patent
Xu et al.

(10) Patent No.: US 12,038,543 B2
(45) Date of Patent: Jul. 16, 2024

(54) X-RAY HIGH-ABSORPTIVITY DETECTION SYSTEM AND IMAGE IMAGING METHOD

(71) Applicant: CARERAY DIGITAL MEDICAL TECHNOLOGY CO., LTD., Suzhou (CN)

(72) Inventors: Yong Xu, Suzhou (CN); Jianqiang Liu, Suzhou (CN)

(73) Assignee: CARERAY DIGITAL MEDICAL TECHNOLOGY CO., LTD., Suzhou (CN)

(*) Notice: Subject to any disclaimer, the term of this patent is extended or adjusted under 35 U.S.C. 154(b) by 36 days.

(21) Appl. No.: 17/786,995

(22) PCT Filed: Oct. 23, 2020

(86) PCT No.: PCT/CN2020/123190
§ 371 (c)(1),
(2) Date: Jun. 17, 2022

(87) PCT Pub. No.: WO2021/120840
PCT Pub. Date: Jun. 24, 2021

(65) Prior Publication Data
US 2023/0017148 A1  Jan. 19, 2023

(30) Foreign Application Priority Data
Dec. 19, 2019 (CN) .......................... 201911315719.3

(51) Int. Cl.
*G01N 23/04* (2018.01)
*G01T 1/20* (2006.01)

(52) U.S. Cl.
CPC ....... *G01T 1/20186* (2020.05); *G01N 23/043* (2013.01); *G01T 1/2016* (2013.01);
(Continued)

(58) Field of Classification Search
CPC .... G01N 23/04; G01N 23/043; G01N 23/046; G01N 23/083; G01N 23/087;
(Continued)

(56) References Cited

U.S. PATENT DOCUMENTS 7,105,826 B2 * 9/2006 Ren .......................... G01T 1/1644
250/366
7,115,876 B2 * 10/2006 Ren .......................... G01T 1/1644
250/366
(Continued)

FOREIGN PATENT DOCUMENTS

| CN | 102305937 A | 1/2012 |
| CN | 105324683 A | 2/2016 |

(Continued)

OTHER PUBLICATIONS

First Office Action issued in Chinese Application No. 201911315719, mailed Apr. 27, 2022; 13 pgs.
International Search Report and Written Opinion issued in International Application No. PCT/CN2020/123190; mailed Jan. 26, 2021; 17 pgs.

*Primary Examiner* — Allen C. Ho
(74) *Attorney, Agent, or Firm* — HAUPTMAN HAM, LLP

(57) ABSTRACT

An X-ray high-absorptivity detection system and an image imaging method are provided. The system comprises a fluorescent layer, a light source for emitting X-rays towards the fluorescent layer, a first visible light sensor, a second visible light sensor, a first image acquisition device, a second image acquisition device. First visible photons moving towards the first visible light sensor and second visible photons moving towards the second visible light sensor are generated under the excitation of X photons; the first image acquisition device is configured for obtaining a first image signal by the first visible light sensor acquiring a first visible (Continued)

photon signal, and the second image acquisition device is configured for obtaining a second image signal by the second visible light sensor acquiring a second visible photon signal; an X-ray image signal is obtained by an addition operation on the two image signals.

11 Claims, 2 Drawing Sheets

(52) U.S. Cl.
CPC ...... *G01T 1/20184* (2020.05); *G01T 1/20187* (2020.05); *G01T 1/20188* (2020.05)

(58) Field of Classification Search
CPC ........ G01N 23/10; G01N 23/12; G01N 23/16; G01N 23/18; G01T 1/20; G01T 1/2002; G01T 1/2006; G01T 1/2018; G01T 1/20181; G01T 1/20182; G01T 1/20183; G01T 1/20184; G01T 1/20185; G01T 1/20186; G01T 1/20187; G01T 1/20188
USPC ...................... 378/51–63, 98.8; 250/370.09
See application file for complete search history.

(56) References Cited

U.S. PATENT DOCUMENTS

| | | | | |
|---|---|---|---|---|
| 7,554,089 B2* | 6/2009 | Burr | ..................... | G01T 1/20182 250/366 |
| 7,834,321 B2* | 11/2010 | Yorkston | .................. | G21K 4/00 250/370.09 |
| 9,588,235 B2* | 3/2017 | Weisfield | ............ | G01T 1/20185 |
| 10,682,116 B2* | 6/2020 | Mollov | ................. | G06T 1/0007 |
| 10,816,682 B2* | 10/2020 | Ota | ......................... | G01T 1/363 |
| 11,156,727 B2* | 10/2021 | Shedlock | ............ | G01T 1/20186 |
| 11,307,313 B2* | 4/2022 | Chen | ..................... | G01T 1/2985 |
| 11,340,359 B2* | 5/2022 | Herrmann | ............. | A61B 6/032 |
| 11,428,830 B2* | 8/2022 | Van De Haar | ........ | G01T 1/2992 |
| 11,531,123 B2* | 12/2022 | Matsuoka | ........... | G01T 1/20188 |

FOREIGN PATENT DOCUMENTS

| | | |
|---|---|---|
| CN | 106539588 A | 3/2017 |
| CN | 110987982 A | 4/2020 |
| CN | 211426809 A | 9/2020 |

* cited by examiner

X-RAY HIGH-ABSORPTIVITY DETECTION SYSTEM AND IMAGE IMAGING METHOD

RELATED APPLICATIONS

The present application is a U.S. National Phase of International Application Number PCT/CN2020/123190 filed Oct. 23, 2020, and claims priority to Chinese Application Number 201911315719.3, filed Dec. 19, 2019.

FIELD OF TECHNOLOGY

The present disclosure relates to the field of X-ray detector imaging, in particular to an X-ray high-absorptivity detection system and an image imaging method.

BACKGROUND

In the prior art, the absorption efficiency of X-rays in the imaging system of the X-ray flat panel detection system plays a decisive role in the quality of imaging, and whether images of the quality that meets the application requirements can be obtained at low doses is the basis for judging the technology of X-ray imaging systems, and it is also the direction that has been studied recently in the field of X-ray imaging. The existing X-ray flat panel detection system has low sensitivity and low X-ray absorptivity.

SUMMARY

To solve the problems in the prior art, the present disclosure provides an X-ray high-absorptivity detection system and an image imaging method, to achieve high-efficiency X-ray absorption, and the technical solutions are as follows:
the present disclosure provides an X-ray high-absorptivity detection system, comprising a light source, a fluorescent layer, a first visible light sensor arranged on the upper surface of the fluorescent layer, a second visible light sensor arranged on the lower surface of the fluorescent layer, a first image acquisition device connected to the first visible light sensor, a second image acquisition device connected to the second visible light sensor, and a processor electrically connected to both the first image acquisition device and the second image acquisition device; the light source is configured to emit an X-ray towards the fluorescent layer, wherein the X-ray reaches the fluorescent layer after passing through the first visible light sensor, the fluorescent layer comprises a material for converting X-rays into visible light, and the material for converting X-ray into visible light generates first visible photons moving towards the first visible light sensor and second visible photons moving towards the second visible light sensor under the excitation of X photons;
the first image acquisition device is configured to obtain a first image signal based on a first visible photon signal acquired by the first visible light sensor; the second image acquisition device is configured to obtain a second image signal based on a second visible photon signal acquired by the second visible light sensor; the processor is configured to perform an addition operation on the first image signal and the second image signal to obtain an X-ray image signal.

Further, the material for converting X-rays into visible light is CsI, $PbF_2$ crystal, $NaBi(WO_4)_2$ crystal, NaI:TI crystal or CsI:TI crystal.

Further, the side edge of the fluorescent layer is provided with an encapsulation layer, the upper portion of the encapsulation layer is in contact with the lower surface of the first visible light sensor, the lower portion of the encapsulation layer is in contact with the upper surface of the second visible light sensor, and the encapsulation layer comprises an X-fluorescence encapsulation material.

Further, the material of the encapsulation material is aluminum film and hot melt adhesive.

Further, the X-ray high-absorptivity detection system further comprises a display assembly connected with the processor.

Further, the processor comprises an addition operation module and a data conversion module, and the addition operation module is configured to perform addition operation of the numbers of photosensitive charges on the first image signal and the second image signal, to obtain an X-ray image and output an electrical signal of the X-ray image; the data conversion module is configured to convert the electrical signal into a data format that can be displayed by the display assembly.

Further, the first visible light sensor and the second visible light sensor are both sheet-like structures; the first visible light sensor matches the shape of the upper surface of the fluorescent layer, and the second visible light sensor matches the shape of the lower surface of the fluorescent layer.

the present disclosure further provides an image imaging method of an X-ray high-absorptivity detection system, comprising:
S1, emitting an X-ray towards the fluorescent layer by a light source, and generating first photons moving upward and second photons moving downward by a material for converting X-rays into visible light of the fluorescent layer under the excitation of X-photons;
S2, acquiring a first photon signal by using a first optical sensor, and acquiring a second photon signal by using a second optical sensor;
S3, obtaining a first image signal by a first image acquisition device based on the first photon signal acquired by the first optical sensor; obtaining a second image signal by a second image acquisition device based on the second photon signal acquired by the second optical sensor;
S4, performing an image addition operation on the first image signal and the second image signal in step S3 by the processor to obtain an X-ray image signal.

Further, in step S2, the first optical sensor is a first visible light sensor, and the second optical sensor is a second visible light sensor; the first visible light sensor is arranged on the upper surface of the fluorescent layer, the second visible light sensor is arranged on the lower surface of the fluorescent layer, and the X-rays reach the fluorescent layer after passing through the first visible light sensor.

Further, the first image signal comprises the number of photosensitive charges at each pixel position, the second image signal comprises the number of photosensitive charges at each pixel position, and the image addition operation comprises addition operation of the numbers of the photosensitive charges.

Further, the image imaging method of an X-ray high-absorptivity detection system is carried out by the X-ray high-absorptivity detection system.

The beneficial effects brought about by the technical solutions provided by the present disclosure are as follows:
a. The X-ray high-absorptivity detection system provided by the present disclosure can improve the absorption of X-rays, improve the sensitivity of the detection system, and at the same time, improve the detective quantum efficiency of the detection system, thereby reducing the dose of clinical X-rays;

b. In the image imaging method of an X-ray high-absorptivity detection system provided by the present disclosure, X-ray image signals for diagnosis can be obtained through addition operation, so as to achieve high absorptivity of X-rays.

BRIEF DESCRIPTION

For more clearly explaining the technical solutions in the embodiments of the present disclosure, the accompanying drawings used to describe the embodiments are simply introduced in the following. Apparently, the below described drawings merely show a part of the embodiments of the present disclosure, and those skilled in the art can obtain other drawings according to the accompanying drawings without creative work.

Figure 1:
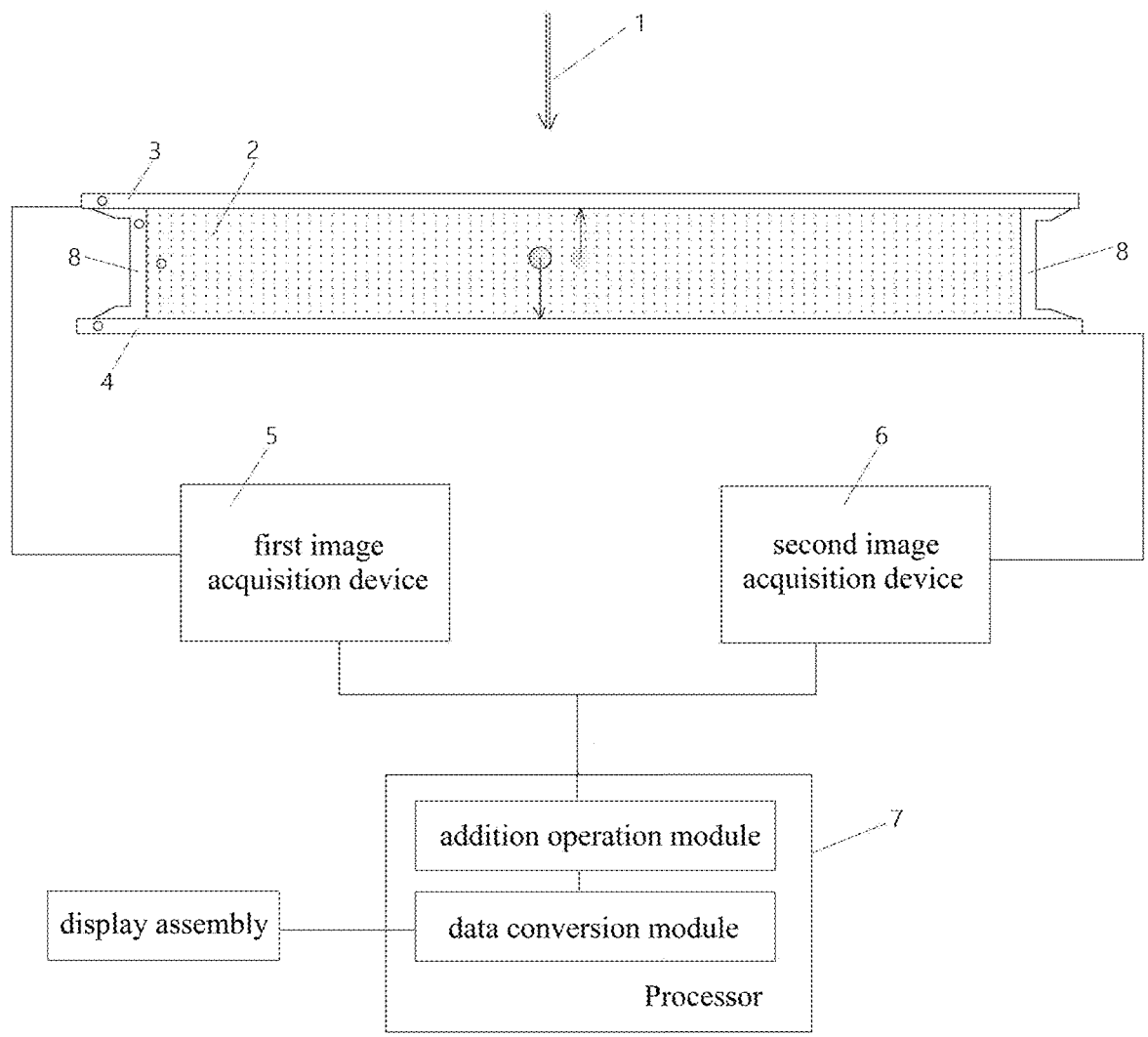
FIG. 1 is a schematic structural diagram of an X-ray high-absorptivity detection system provided by an embodiment of the present disclosure.

Wherein, the reference numerals comprise: 1—light source, 2—fluorescent layer, 3—first visible light sensor, 4—second visible light sensor, 5—first image acquisition device, 6—second image acquisition device, 7—processor, 8—encapsulation layer.

DETAILED DESCRIPTION

In order to enable those skilled in the art to better understand the solutions of the present disclosure, in the following, the technical solutions in the embodiments of the present disclosure are explained clearly and completely in conjunction with the accompanying drawings, and apparently, the described embodiments are merely a part of the embodiments of the present disclosure, not all the embodiments. Based on the embodiments of the present disclosure, all other embodiments obtained by one of ordinary skill in the art without creative work fall within the protective scope of the present disclosure.

The present disclosure provides an X-ray high-absorptivity detection system, referring to FIG. 1, the detection system comprises a light source 1, a fluorescent layer 2, a first visible light sensor 3 arranged on the upper surface of the fluorescent layer 2, a second visible light sensor 4 arranged on the lower surface of the fluorescent layer 2, a first image acquisition device 5 connected to the first visible light sensor 3, a second image acquisition device 6 connected to the second visible light sensor 4, and a processor 7 electrically connected to both the first image acquisition device 5 and the second image acquisition device 6.

The specific implementation of the X-ray high-absorptivity detection system provided by the present disclosure to output an X-ray image is as follows: the light source 1 is configured to emit an X-ray towards the fluorescent layer 2, the X-ray reaches the fluorescent layer 2 after passing through the first visible light sensor 3, wherein the fluorescent layer 2 comprises a material for converting X-rays into visible light, and the material for converting X-rays into visible light is CsI (cesium iodide), or other scintillators (for example, $PbF_2$ crystal, $NaBi(WO_4)_2$ crystal, NaI:Tl crystal or CsI:Tl crystal); scintillators are a kind of material that can emit light after absorbing high-energy particles or rays, which can be directly purchased in the market, and the material for converting X-ray into visible light generates first visible photons moving towards the first visible light sensor 3 and second visible photons moving towards the second visible light sensor 4 under the excitation of X photons, and the moving directions of the first visible photons and the second visible photons refer to the directions indicated by the arrows in the fluorescent layer 2 in FIG. 1, the first visible photons are absorbed by the first visible light sensor 3, and the second visible photon is absorbed by the second visible light sensor 4, so that all visible photons are absorbed, which greatly improves the absorption efficiency of X-rays.

The first image acquisition device 5 is configured to obtain a first image signal on the basis of a first visible photon signal acquired by the first visible light sensor 3, the second image acquisition device 6 is configured to obtain a second image signal on the basis of a second visible photon signal acquired by the second visible light sensor 4, and the processor 7 is configured to perform an addition operation on the first image signal and the second image signal to obtain an X-ray image signal for diagnosis.

Further, the X-ray high-absorptivity detection system further comprises a display assembly connected with the processor 7. The processor 7 comprises an addition operation module and a data conversion module, and the addition operation module is configured to perform addition operation of the numbers of photosensitive charges on the first image signal and the second image signal, to obtain an X-ray image and output an electrical signal of the X-ray image; the data conversion module is configured to convert the electrical signal into a data format that can be displayed by the display assembly.

The side edge of the fluorescent layer 2 is provided with an encapsulation layer 8, and the encapsulation layer 8 is arranged between the first visible light sensor 3 and the second visible light sensor 4, the encapsulation layer 8 is configured for coating the fluorescent layer, wherein the upper portion of the encapsulation layer 8 is in contact with the lower surface of the first visible light sensor 3, and the lower portion of the encapsulation layer 8 is in contact with the upper surface of the second visible light sensor 4. The encapsulation layer 8 comprises an X-ray fluorescent encapsulation material, the material of the encapsulation material is aluminum film and hot melt adhesive, and the encapsulation material can be directly purchased in the market. Specifically, the aluminum film of the encapsulation layer 8 is encapsulated by hot melt adhesive and mounted between the first visible light sensor 3 and the second visible light sensor 4 to form the side wall of the X-ray high-absorptivity detection system.

The first visible light sensor 3 and the second visible light sensor 4 are both sheet-like structures, preferably, the first visible light sensor 3 and the second visible light sensor 4 have the same shape and size; the first visible light sensor 3 matches the shape of the upper surface of the fluorescent layer 2, and the second visible light sensor 4 matches the shape of the lower surface of the fluorescent layer 2. The encapsulation layer 8 has an inward recess structure relative to the first visible light sensor 3 and the second visible light sensor 4.

The main working principle of the X-ray high-absorptivity detection system provided by the present disclosure is as follows: X-rays are projected through the first visible light sensor 3 and then reach the fluorescent layer 2, and the material for converting X-rays into visible light is excited by the X-photons to generate visible photons, part of the photons moving downward are absorbed by the second visible light sensor 4, and another part of the photons moving upward are absorbed by the first visible light sensor 3, and by controlling the shortest path of the visible photons moving upward, the visible photons moving upward are reduced to be reflected and reabsorbed, and are directly absorbed by the first visible light sensor 3, which can improve the absorption efficiency of this part of the visible photons moving upward, so as to greatly improve the absorption efficiency of X-rays. Both the first visible light sensor 3 and the second visible light sensor 4 absorb visible photons, and the first image acquisition device 5 and the second image acquisition device 6 both acquire images at the same time, the first image signal acquired by the first image acquisition device 5 and the second image signal acquired by the second image acquisition device 6 are processed and combined into one image by the processor, which can improve DQE (detective quantum efficiency), thereby improving the absorption efficiency of X-rays and reducing the dose of clinical X-rays.

The X-ray high-absorptivity detection system provided by the present disclosure can improve the X-ray conversion and absorption efficiency, and in actual use, the use of this technology can reduce the dose of X-rays and obtain images of the same quality, which is equivalent to improving the DQE (quantum conversion efficiency) of the X-ray detector under the same X-ray dose conditions, and obtaining images suitable for clinical use at low X-ray doses.

Figure 2:
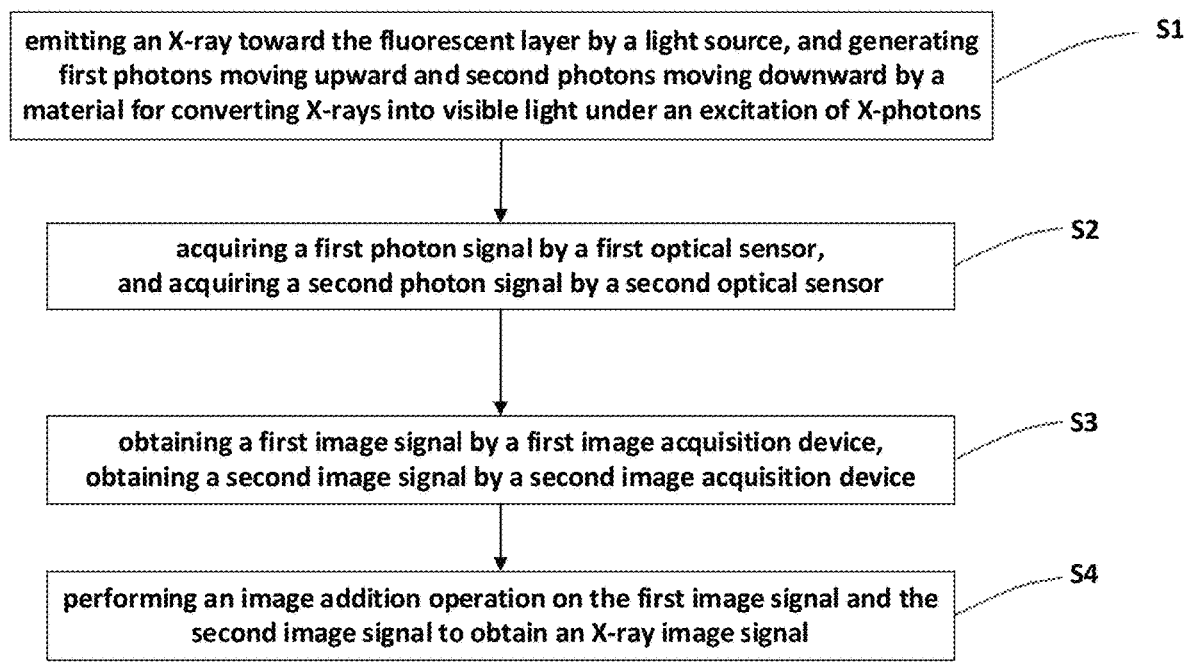
FIG. 2 is a schematic flow chart of an image imaging method of an X-ray high-absorptivity detection system provided by an embodiment of the present disclosure.

The present disclosure further provides an image imaging method of an X-ray high-absorptivity detection system, referring to FIG. 2, it comprises the following steps:

S1, emitting an X-ray towards the fluorescent layer by a light source, and generating first photons moving upward and second photons moving downward by a material for converting X-rays into visible light of the fluorescent layer under the excitation of X-photons;

S2, acquiring a first photon signal by using a first optical sensor, and acquiring a second photon signal by using a second optical sensor; preferably, the first optical sensor is a first visible light sensor, and the second optical sensor is a second visible light sensor; the first visible light sensor is arranged on the upper surface of the fluorescent layer, the second visible light sensor is arranged on the lower surface of the fluorescent layer, and the X-rays reach the fluorescent layer after passing through the first visible light sensor;

S3, obtaining a first image signal by a first image acquisition device based on the first photon signal acquired by the first optical sensor; obtaining a second image signal by a second image acquisition device based on the second photon signal acquired by the second optical sensor;

S4, performing an image addition operation on the first image signal and the second image signal in step S3 by a processor to obtain an X-ray image signal, specifically, the first image signal comprises the number of photosensitive charges at each pixel position, the second image signal comprises the number of photosensitive charges at each pixel position, and the image addition operation comprises addition operation of the numbers of the photosensitive charges, that is, performing an addition operation on the number of photosensitive charges at each pixel position in the first image signal and on the number of photosensitive charges at each pixel position in the second image signal to obtain the sum of the numbers of the photosensitive charges at the corresponding pixel positions, and obtaining an X-ray image signal for diagnosis according to this sum of the numbers of the photosensitive charges at the corresponding pixel positions.

The image imaging method of an X-ray high-absorptivity detection system provided by the present disclosure is carried out by the X-ray high-absorptivity detection system.

In the image imaging method of an X-ray high-absorptivity detection system provided by the present disclosure, X-ray image signals for diagnosis can be obtained through addition operation, so as to achieve high absorptivity of X-rays, and reduce the dose of X-rays.

The above are only preferred embodiments of the present disclosure, and are not intended to limit the present disclosure. Any modifications, equivalent substitutions, improvements, etc. made within the spirit and principle of the present disclosure shall be included in the protective scope of the present disclosure.

What is claimed is:

1. An X-ray high-absorptivity detection system, comprising:
a light source;
a fluorescent layer;
a first visible light sensor arranged on an upper surface of the fluorescent layer;
a second visible light sensor arranged on a lower surface of the fluorescent layer;
a first image acquisition device for obtaining an image signal based on a visible photon signal, which is connected to the first visible light sensor;
a second image acquisition device for obtaining an image signal based on a visible photon signal, which is connected to the second visible light sensor; and
a processor for performing an addition operation on image signals, which is electrically connected to both the first image acquisition device and the second image acquisition device;
the light source is configured to emit an X-ray towards the fluorescent layer,
wherein the X-ray reaches the fluorescent layer after passing through the first visible light sensor;
the fluorescent layer comprises a material for converting the X-ray into visible light, and the material for converting the X-ray into visible light generates first visible photons moving towards the first visible light sensor and second visible photons moving towards the second visible light sensor under an excitation of X photons;
the first image acquisition device is configured to obtain a first image signal based on a first visible photon signal acquired by the first visible light sensor;
the second image acquisition device is configured to obtain a second image signal based on a second visible photon signal acquired by the second visible light sensor; and
the processor is configured to perform an addition operation on the first image signal and the second image signal to obtain an X-ray image signal.

2. The X-ray high-absorptivity detection system according to claim 1, wherein the material for converting the X-ray into visible light is CsI, $PbF_2$ crystal, $NaBi(WO_4)_2$ crystal, NaI:Ti crystal, or CsI:Ti crystal.

3. The X-ray high-absorptivity detection system according to claim 1, further comprising an encapsulation layer,
wherein a side edge of the fluorescent layer is provided with the encapsulation layer, an upper portion of the encapsulation layer is in contact with a lower surface of the first visible light sensor, a lower portion of the encapsulation layer is in contact with an upper surface of the second visible light sensor, and the encapsulation layer comprises an X-fluorescence encapsulation material.

4. The X-ray high-absorptivity detection system according to claim 3, wherein the X-fluorescence encapsulation material comprises an aluminum film and hot melt adhesive.

5. The X-ray high-absorptivity detection system according to claim 1, further comprising a display assembly connected with the processor.

6. The X-ray high-absorptivity detection system according to claim 5, wherein the processor comprises an addition operation module for performing an addition operation of numbers of photosensitive charges on the image signals and a data conversion module for converting an electrical signal into a displayable data format,
wherein the addition operation module is configured to perform an addition operation of numbers of photosensitive charges on the first image signal and the second image signal, to obtain the X-ray image signal; and
the data conversion module is configured to convert the X-ray image signal into a data format that can be displayed by the display assembly.

7. The X-ray high-absorptivity detection system according to claim 1, wherein the first visible light sensor and the second visible light sensor are both sheet-like structures; wherein the first visible light sensor matches a shape of the upper surface of the fluorescent layer, and the second visible light sensor matches a shape of the lower surface of the fluorescent layer.

8. An image imaging method for an X-ray high-absorptivity detection system, comprising:
S1, emitting an X-ray towards a fluorescent layer by a light source, and generating first photons moving upward and second photons moving downward by a material of the fluorescent layer for converting the X-ray into visible light under an excitation of X-photons;

S2, acquiring a first photon signal by using a first optical sensor, and acquiring a second photon signal by using a second optical sensor;

S3, obtaining a first image signal by a first image acquisition device based on the first photon signal acquired by the first optical sensor and obtaining a second image signal by a second image acquisition device based on the second photon signal acquired by the second optical sensor; and S4, performing an image addition operation on the first image signal and the second image signal in step S3 by a processor to obtain an X-ray image signal.

9. The image imaging method for an X-ray high-absorptivity detection system according to claim 8, wherein the first optical sensor in step S2 is a first visible light sensor, and the second optical sensor is a second visible light sensor; the first visible light sensor is arranged on an upper surface of the fluorescent layer, the second visible light sensor is arranged on a lower surface of the fluorescent layer, and the X-ray reach the fluorescent layer after passing through the first visible light sensor.

10. The image imaging method for an X-ray high-absorptivity detection system according to claim 8, wherein the first image signal comprises a number of photosensitive charges at each pixel position, the second image signal comprises a number of photosensitive charges at each pixel position, and the image addition operation comprises an addition operation of the number of photosensitive charges at each pixel position in the first image signal and the number of photosensitive charges at each pixel position in the second image signal.

11. The image imaging method for an X-ray high-absorptivity detection system according to claim 8, being carried out by the X-ray high-absorptivity detection system.

* * * * *